R. REYNOLDS AND H. GIBBS.
HEAVY TRACTION ATTACHMENT SUITABLE FOR MOTOR ROAD VEHICLES.
APPLICATION FILED JUNE 29, 1918.
1,383,566.
Patented July 5, 1921.
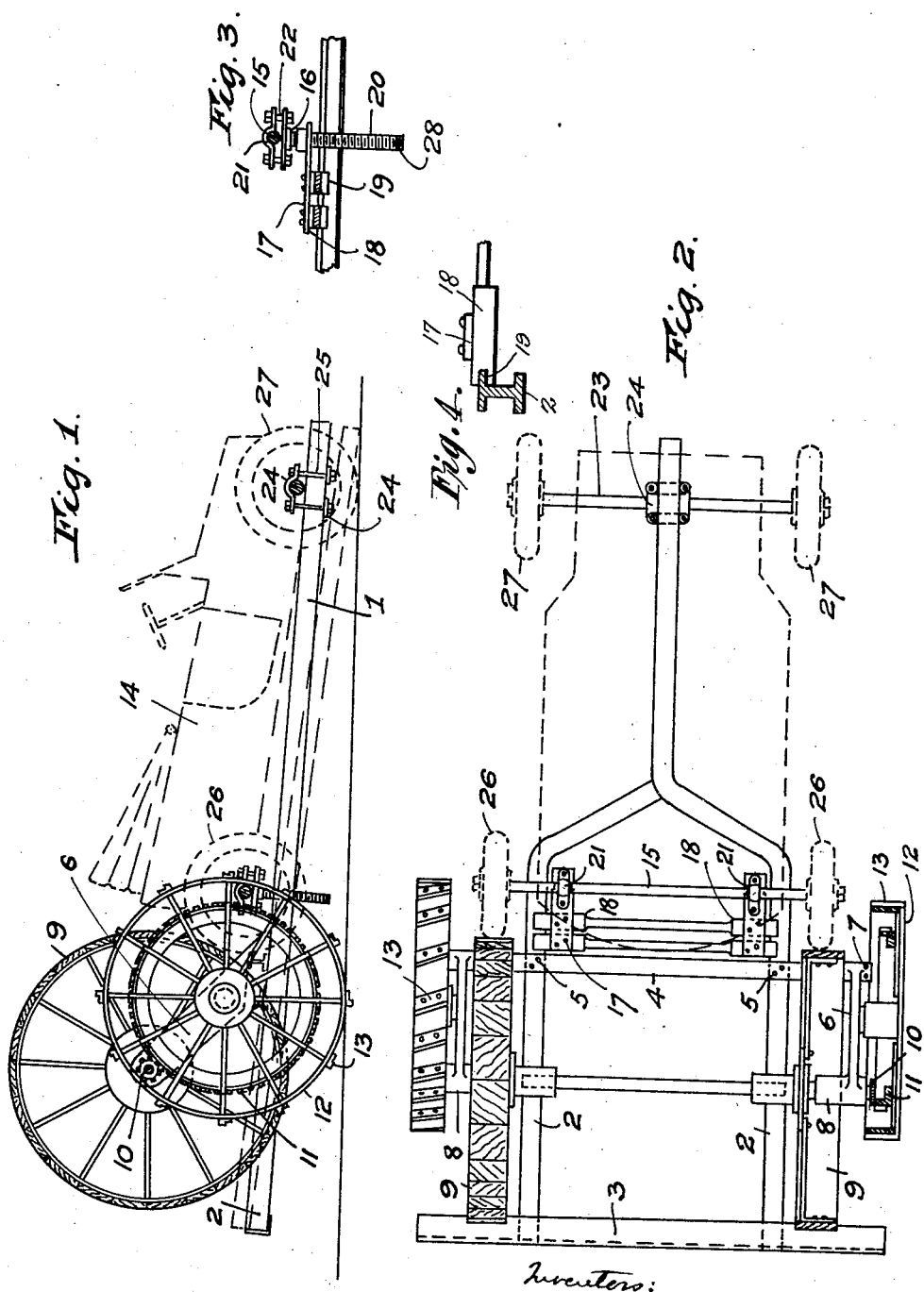

UNITED STATES PATENT OFFICE.

RICHARD REYNOLDS AND HARRY GIBBS, OF BIRKENHEAD, ENGLAND.

HEAVY-TRACTION ATTACHMENT SUITABLE FOR MOTOR ROAD-VEHICLES.

1,383,566.     Specification of Letters Patent.      Patented July 5, 1921.

Application filed June 29, 1918. Serial No. 242,593.

*To all whom it may concern:*

Be it known that we, RICHARD REYNOLDS and HARRY GIBBS, subjects of the King of Great Britain, and residents of Birkenhead, England, have invented certain new and useful Improvements in Heavy-Traction Attachments Suitable for Motor Road-Vehicles, of which the following is a specification.

This invention has for its object the provision of means whereby an ordinary motor driven road vehicle may be used as the power plant when attached to suitable mechanism, and without any alteration of the motor car mechanism or its wheels, for the purpose of heavy haulage, such as plowing and heavy road traction generally.

According to this invention a framework is provided carrying one or more tractor wheels of suitable diameter and width of tread, the treads being provided with projections or the like for gripping soft surfaces. The tractor wheels are fitted with toothed rings of large diameter engaged and driven by pinions, which pinions are in turn carried on the same spindle as, and rotate with, a friction wheel or friction wheels. The frame is provided with means whereby it may be attached to an ordinary motor car or motor cycle chassis, and means are also provided for jacking up and lifting the rear or driving wheel or wheels of the car or the like a suitable distance clear of the ground, this action also causing the driving wheel or wheels of the motor vehicle to engage frictionally with, and drive, the friction wheel or wheels of the tractor. Means are also provided for securing the framework of the tractor mechanism to the front axle or wheels of the car, and if desired a metallic shrouding tread may be provided held in place on the front wheels by the inflation of the tires thereof, these metallic shroudings assisting in enabling the motor vehicle to grip soft ground and facilitate the steering of the combined motor vehicle and tractor when connected.

Apparatus in accordance with this invention is shown in the accompanying drawings, in which Figure 1 is a side elevation showing the motor road vehicle connected up to the tractor, and Fig. 2 a plan view of Fig. 1, Fig. 3 being a detail showing the means for securing the rear axle to the tractor frame and jacking up the wheels of the car into frictional contact with the corresponding friction wheels of the tractor. Fig. 4 is another detail view of what is shown in Fig. 3.

In carrying out the invention, as applied to an ordinary motor car, the tractor comprises a framework 1 of H-iron having two side rear members 2 connected at the rear by a transverse angle iron 3 and terminating at the front in a single member 1; a second transverse girder 4, preferably of H-section, is bolted at 5 to the side members 2. Carried from the ends of the transverse girder 4 are brackets 6, the feet of which are bolted at 7 to the transverse girder 4, such brackets carrying bearings 8 in which are journaled the friction wheels 9, the peripheries of which may be fitted with wooden blocks or other frictional surfaces. The spindles of the friction wheels 9 carry pinions 10, Figs. 1 and 2, which gear into toothed rings 11 bolted to the spokes of, or otherwise secured to, the tractor wheels 12 which are themselves rotatively carried on spindles or other bearings projecting from the brackets 6 and the peripheries of which are provided with projecting pieces 13, here shown as short angle iron pieces set inclined on the wheel rim and bolted thereto. In this way when the friction wheels 9 are driven the tractor wheels 12 will be slowly rotated.

In operation the tractor frame 1, 2, being in the dotted position shown in Fig. 1, its front end resting on the ground, the motor car 14 is backed into position over the frame until the rear axle of the car comes over the heads 16 of two screw jacks, carried from the side members 2 in any suitable manner, such as by brackets 17 overhanging from cross stays 18 which are detachably clipped at 19 Figs. 3 and 4, to the upper web of the side girders 2, being longitudinally movable thereon as is apparent from the showing in the drawing. The screwed stems 20 of the jacks are threaded into bosses at the ends of the brackets 17 and the heads 16 of the jacks are fitted with detachable straps or yokes 21 which, when the motor car has been backed into position over the jacks, are placed over the axle 15 and secured to the heads by bolts 22. The front axle 23 of the car is then secured to the front of the tractor frame 1 by straps 24 and bolts 25. While in this position, both pairs of wheels 26, 27, of the motor car frame are on the ground. If the rear axle 15 be now raised by means of the screw jacks, say by inserting a bar into the tommy holes 28, the rear wheels 26 of the car are gradually brought up into engagement with the peripheries of the friction wheels 9. On starting the engine of the car, therefore, the friction wheels are driven through the grip of the tires of the rear wheels 26 and the tractor wheels 12 rotated, the combined mechanism then running on the tractor wheels 12 and the usual front wheels 27 of the motor car. The tractor is thus under the usual forward speed controls and reverse drive of the motor car.

It will be seen, therefore, that the connection of the motor car to the tractor does not require the detachment of the motor car wheels, nor the disturbance of any of its parts except the mud guards, this being a considerable advantage, as it enables the tractor to be connected and disconnected in a minimum time.

Where it is desired that the combined car and tractor should not run on the front wheel tires of the car, a metallic band or shrouding provided with suitable exterior projections may be fitted on the front wheels 27, and retained in position by the inflation of the tires against the inner surfaces of such bands or shroudings. The plow or other implement, where the device is to be used for agricultural apparatus, or the vehicle, where the device is to be used for road, or other haulage, is attached to the transverse girders 3 or 4.

Where the device is to be used in connection with a motor bicycle only one frictional wheel 9 would be fitted, and this would be disposed centrally in the tractor framework.

In case it may be required to increase the frictional grip between the rear wheels 26 of the car and the frictional wheels 9 of the tractor, an additional tension gear may be provided, consisting of a chain or the like passed around the rear transverse bar 3 and the rear axle 15 of the car, a stretching screw or the like being provided for pulling up the rear axle and pressing the rear wheels 26 tightly against the tractor wheels 9.

The width of the tread of the friction wheels 9, and their distance apart, are so arranged as to accommodate the rear wheels of motor cars of all pitches, and similarly the length of the tractor chassis 1 is made sufficient to extend to the front axle of all makes of motor cars, the tractor being thus adaptable to any type of car.

We claim:

An attachment for motor vehicles comprising a wheeled frame adapted to be pivoted to a forward portion of a vehicle, a driving connection between the rear vehicle wheels and the wheels of the frame, a supporting member mounted on the frame, and a device carried by the supporting member for vertically adjusting the rear portion of the vehicle with respect to the frame, said supporting member being longitudinally adjustable with respect to the frame to permit application of the attachment in predetermined relation with vehicles of different lengths.

In testimony whereof we affix our signatures in presence of two witnesses.

RICHARD REYNOLDS.
HARRY GIBBS.

Witnesses:
A. J. DAVIES,
E. HEGINBOTHAM.